United States Patent
Winfield et al.

(10) Patent No.: US 9,127,452 B1
(45) Date of Patent: Sep. 8, 2015

(54) POROUS SEPTUM CAP

(71) Applicant: ROHR, INC., Chula Vista, CA (US)

(72) Inventors: Ian F. Winfield, San Diego, CA (US); Robert L. Braden, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 14/251,440

(22) Filed: Apr. 11, 2014

(51) Int. Cl.
| | |
|---|---|
| *E04B 1/86* | (2006.01) |
| *B32B 3/12* | (2006.01) |
| *F02C 7/045* | (2006.01) |
| *E04B 1/74* | (2006.01) |

(52) U.S. Cl.
CPC ... *E04B 1/86* (2013.01); *B32B 3/12* (2013.01); *F02C 7/045* (2013.01); *E04B 2001/748* (2013.01); *F05D 2250/283* (2013.01)

(58) Field of Classification Search
CPC ........ B64D 29/00; G10K 11/172; B32B 3/12; F05D 2250/283; F02C 7/045; E04B 2001/748
USPC .................................................. 181/213, 292
See application file for complete search history.

(56) References Cited

U.S. PATENT DOCUMENTS

| | | | |
|---|---|---|---|
| 5,344,280 A * | 9/1994 | Langenbrunner et al. | 415/9 |
| 5,785,919 A * | 7/1998 | Wilson | 264/401 |
| 5,997,985 A * | 12/1999 | Clarke et al. | 428/116 |
| 6,371,242 B1 * | 4/2002 | Wilson et al. | 181/292 |
| 7,854,298 B2 | 12/2010 | Ayle | |
| 8,047,329 B1 * | 11/2011 | Douglas et al. | 181/292 |
| 8,066,098 B2 | 11/2011 | Ayle | |
| 8,800,714 B2 * | 8/2014 | Ichihashi | 181/292 |
| 2005/0178489 A1 * | 8/2005 | Belleguic et al. | 156/64 |
| 2011/0073407 A1 | 3/2011 | Ayle | |
| 2012/0037449 A1 | 2/2012 | Ayle | |
| 2013/0062143 A1 | 3/2013 | Ichihashi | |
| 2013/0171407 A1 * | 7/2013 | Franzoi et al. | 428/116 |
| 2013/0220731 A1 * | 8/2013 | Ayle et al. | 181/222 |
| 2014/0133964 A1 * | 5/2014 | Ayle | 415/119 |

* cited by examiner

*Primary Examiner* — Jeremy Luks
(74) *Attorney, Agent, or Firm* — Snell & Wilmer LLP (57) ABSTRACT

A passive noise attenuation system is described herein. The passive noise attenuation system may comprise an acoustic structure. The acoustic structure may comprise a perforated top sheet and a core accessible via the perforated top sheet. The core may comprise a cell having a plurality of interior walls. The acoustic structure may comprise a back skin. The acoustic structure may comprise an inherently porous material disposed between the top sheet and the back skin, wherein the porous material forms a plane or multiple planes coupled to each interior wall to tangentially subdivide the core.

19 Claims, 6 Drawing Sheets

FIG. 5B

POROUS SEPTUM CAP

FIELD

The present disclosure relates to the attenuation of sound waves, and more particularly, to acoustic properties of structures within a chamber.

BACKGROUND

One method of dealing with excess noise generated by a specific source is to treat the noise at the source. This is typically accomplished by adding acoustic damping structures (acoustic treatments) to the structure surrounding the noise source. One particularly problematic noise source is the jet engines used on most passenger aircraft.

Open cell honeycomb core is a popular material for use in aircraft and aerospace vehicles because it is relatively strong and lightweight. For acoustic applications, a goal has been to incorporate acoustic material into the honeycomb structure. For instance, historically, acoustic material having a flange portion has been inserted into the honeycomb cells. The flange portion is substantially thicker than the acoustic material and provides an anchoring surface that is used to attach the acoustic material to the walls of the honeycomb. These flanged elements are initially held in place within the cells by frictional locking between the anchoring surface and the cell walls. This frictional locking is sufficient to keep the flanged elements in position until they are permanently bonded in place with an adhesive. Often times, capillary wetting is then used to integrate adhesive into the acoustic material then cured to secure the flanged element to the honeycomb wall. It would be beneficial to reduce the need for the additional processing steps utilized in this procedure. Also, it would be beneficial to produce an acoustic treatment material that does not require an anchoring surface/material that is separate from and/or have different properties than the acoustic material.

SUMMARY

A passive noise attenuation system is described herein. The passive noise attenuation system may comprise an acoustic structure. The acoustic structure may comprise a perforated top sheet and a core accessible via the perforated top sheet. The core may comprise a cell having a plurality of interior walls. The acoustic structure may comprise a back skin. The acoustic structure may comprise an inherently porous material disposed between the top sheet and the back skin, wherein the porous material forms a plane or multiple planes coupled to each interior wall to subdivide the core.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
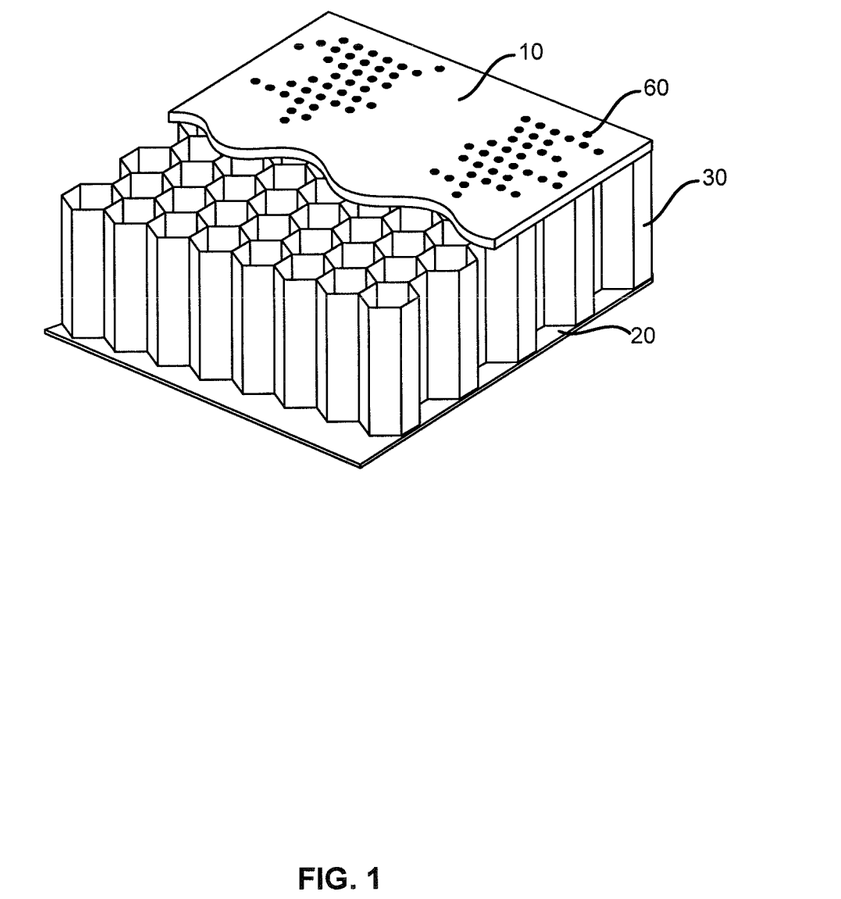
FIG. 1 depicts a single degree of freedom honeycomb core structure.

According to various embodiments, aspects of the present disclosure may relate to a structure, such as an acoustic treatment structure referred to herein as a porous septum cap. The porous septum cap may be formed within and/or inserted into a core structure. With reference to FIG. 1, a core structure may comprise a series of cells 30, positioned between a top sheet 10 and a back skin 20.

Figure 2:
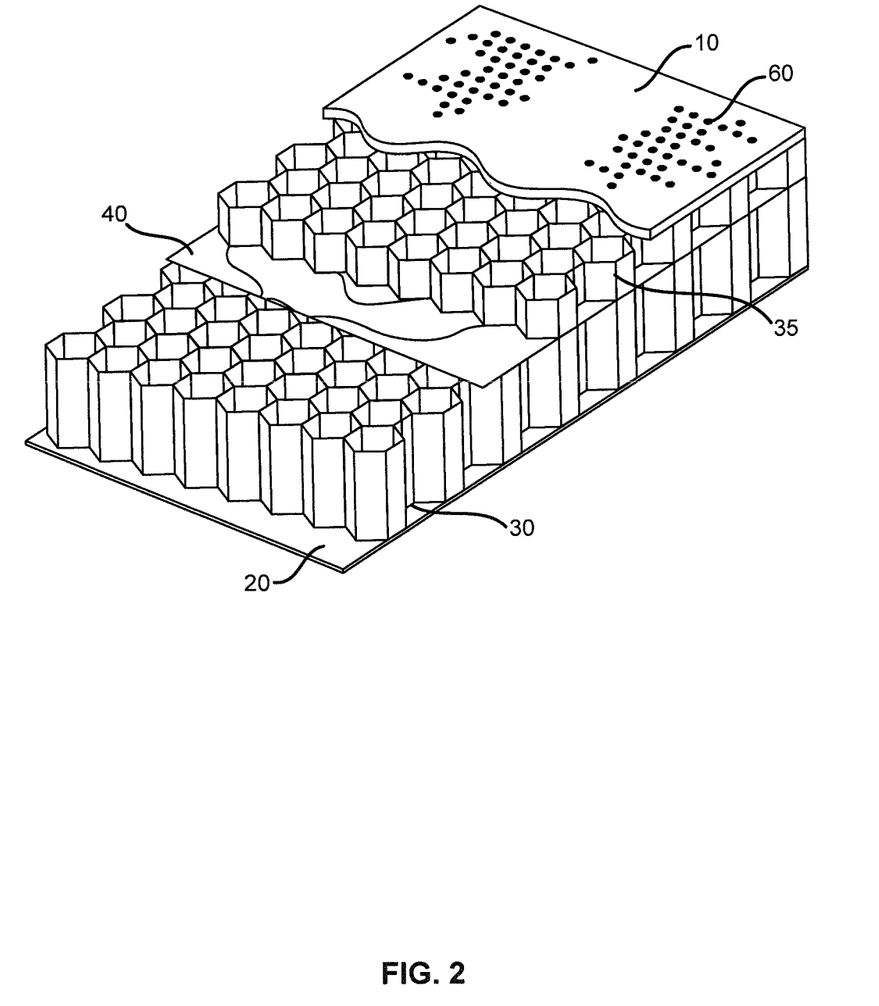
FIG. 2 depicts a double degree of freedom honeycomb core structure.

The shape of each cell 30 of the series of cells 30 may be any shape, but for the sake of brevity, the cells 30 discussed herein may each comprise six sides and in the aggregate be referred to as honeycomb structure and/or honeycomb core. The honeycomb core may also comprise a transverse wall; more commonly called a septum 40 (See FIG. 2). The septum 40 may be a micro-porous wall in which holes are formed, that partitions each cell 30. For instance, the honeycomb structure may be a structure with a Single Degree Of Freedom (SDOF) (no septum), 2 degrees of freedom, e.g. Double Degree Of Freedom, (DDOF) structure (a single septum), or more generally with M degrees of freedom, e.g. Multiple Degree Of Freedom (MDOF), where M is an integer larger than 2 (having multiple septum layers). Stated another way, SDOF honeycomb structure comprises a single layer of cells 30 while a DDOF honeycomb structure is composed of a stack of two layers of cells 30, 35 and an MDOF honeycomb structure is composed of a stack of M layers of cells, where M is an integer number greater than 2 (not depicted). The bottom of a layer or stack of layers of cells 30 may be closed by a generally rigid non-perforated plate referred to herein as the back skin 10. The back skin 10 may act as an acoustic reflector. A top sheet 10 having perforations 60 may be coupled to the top of the honeycomb structure. Additional layers may be formed on top of the perforated 60 top sheet 10 for airflow and/or acoustic properties as desired. The perforated 60 top sheet 10, cell 30, and back skin 20 combine to form a chamber of the honeycomb cell 30 that becomes a resonating chamber and works to damp acoustic emissions, such as sound waves from an aircraft engine. Stated another way, one function of the honeycomb structure may be to attenuate sound waves, such as high frequency sound waves (for example, in the frequency range varying from 4000 Hz to 5000 Hz).

Figure 3:
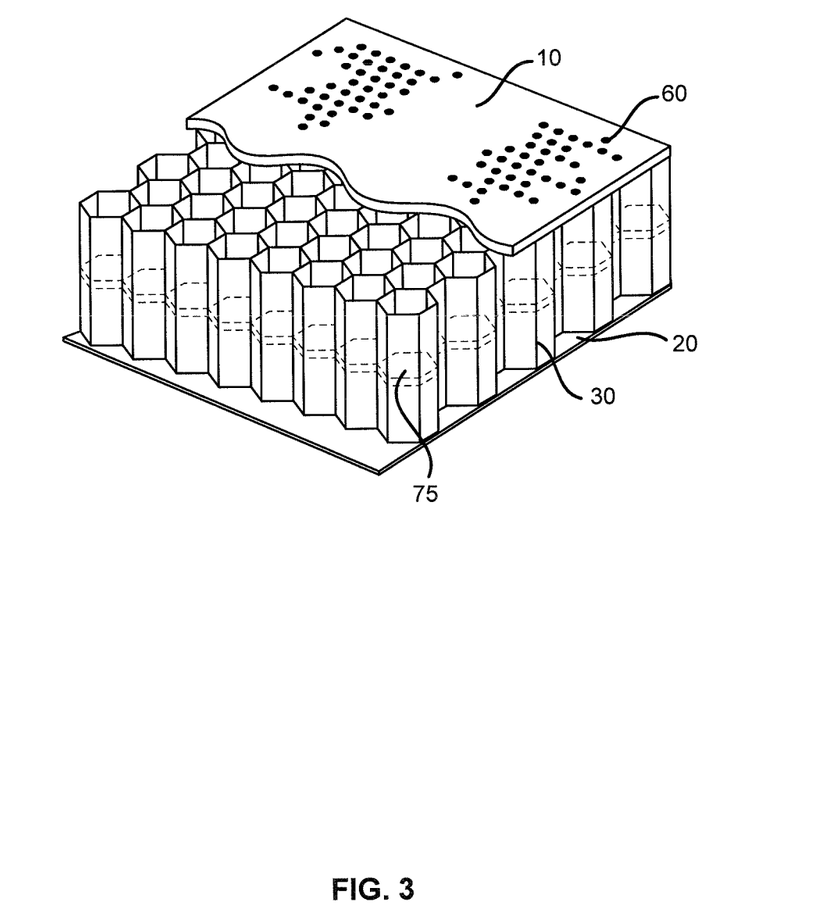
FIG. 3 illustrates an acoustic treatment material (e.g., porous septum cap) disposed within a honeycomb core, in accordance with various embodiments.

According to various embodiments, and with reference to FIG. 3, cells 30 of the SDOF honeycomb structure may comprise an open cell porous material and/or porous septum cap 75 located between the top sheet 10 and the back skin 20 within the cell 30. The porous septum cap 75 may be located at any level between the top sheet 10 and the back skin 20. The porous material may form a plane across and/or coupled to each interior wall to subdivide the cell 30 horizontally. The subdividing may not be equal. A chamber may be formed between the bottom of the porous material/porous septum cap 75 and the back skin 20. Though the porous septum cap 75 is depicted as being used within a SDOF honeycomb structure, it may also be used within DDOF and MDOF honeycomb structures. The open cell porous material/porous septum cap 75 may be configured for acoustic purposes, such as attenuation of sound waves, diffraction of sound waves, and/or to form a torturous path for sound waves. The open cell porous material/porous septum cap 75 may comprise an inherently porous material. For instance, the inherently porous material may comprise a metal such as nickel, nickel alloy, stainless steel, stainless steel alloy, titanium, titanium alloy, Inconel, copper, bronze, and aluminum and aluminum alloy. Furthermore, the porous material may comprise a particulate or fiber reinforced metal. Ceramic, metallic or organic porous materials can be used to provide the desired properties such as adhesion, environmental stability, weatherability, pore sizing and ease of processing. For instance, the inherently porous material may comprise a ceramic such as Aluminum oxide, Beryllium oxide, Cerium oxide, Zirconium dioxide, Boride, Silicon Carbide. The porous material may comprise a particulate or fiber reinforced ceramic. The inherently porous material may comprise a non-woven carbon material, such as carbon nanotubes, carbon nanofibers or graphitic carbon. The inherently porous material may comprise a high temp polymeric material such as Polyimide, Bismaleimide (BMI), or Phenolic. The inherently porous material may have an operating temperature above any desired level, such as about 350 degrees Fahrenheit. The material may be a particulate or fiber reinforced polymer.

Additionally, nano particulate and/or nano scaled fibers can be used to provide smaller pore sizes, which in turn allow for broadband noise mitigation when combined with septum caps made with other porous materials. For example, the inherently porous material may be a foam material. Inherently porous material may describe that the pores are created within the material as the material is being initially formed. According to various embodiments, the porous septum cap 75 may be inherently porous on a nano scale or a micro scale.

The porosity may be a function of the formation of the material. Stated another way, the foam may be porous without introducing a secondary process to induce pores. In other words, an after-the-fact microperforation process is not needed to introduce an open cell structure in the porous septum cap 75. The porous septum cap may be created as part of the fabrication of the foam. Moreover, the pores and/or porosity may be of a randomized pore size. Moreover, the distribution of pores across and through the thickness of the porous septum cap 75 may be randomized. Stated another way, the structure and placement of pores of the porous septum cap 75 may not be repeated in a structured (i.e., ordered) way. The pores may not be situated in a symmetrical setup. The open cell porous material may be a nonwoven material, unlike a screen or mesh material. The open cell porous material may be a non-woven material, such as nano structured non-woven material. The porosity and/or pore size may be tunable to a desired scale. For instance, via chemical treatment during and/or post foam fabrication the pores size may be controlled to a desired average pore size on a per porous septum cap 75 basis. Conditions of chemical treatments such as treatment time, chemical constituents and/or concentration can be used to tailor pore sizing and compatibility with the honeycomb structure. The chemical treatment process may include exposure to a temperature and pressure controlled environment. The porous septum cap 75 may comprise a malleable material.

According to various embodiments, the porous septum cap 75 is an inherently adhesive foam. For instance, the material of the porous septum cap 75 comprises an adhesive binder. Impregnation can be achieved via adhesive bath, spray coating, dip coating or a combination thereof. According to various embodiments, a small amount of polymer binder (such as polyurethane) can be mixed with the material and a blowing agent and gas may be used to foam the mixture. Foaming can be achieved during pre-cure processing or as a result of the cure cycle. Cure variables such as heat, ramp rate, pressure and cure time can be used to control the final porosity of the septum material. According to various embodiments, carbon nano fiber materials and/or nanotubes, can be treated with adhesive binder to form an inherently porous foam and bonded within the cell 30. The processing flexibility of carbon nanotube and carbon nano fiber material allows for control of properties such as porosity, particle size, density/ weight, roughness (on a micro scale) and film/foam thickness. Longer filaments may be more apt to mitigate acoustic waves. The porosity of high aspect ratio (where the length is greater than the width) nanotube and nanofiber material can be as high as 90% creating a foam with significant surface area. The desired porosity of the porous septum cap 75 may be maintained despite the introduction of the adhesive binder, such as with a very thin sizing of binder. The porous septum cap 75 treated with adhesive binder may be bonded onto a substrate such as an interior surface of a cell 30. The adhesive rich porous septum cap 75 may be malleable and can form around and then bond to cell walls.

The porous septum cap can be pre-fabricated by cutting from a sheet of bulk material. The malleable porous septum cap can be cut to a diameter larger than the Honeycomb cell and form fitted into the cell. Additionally, the malleable porous septum can be mechanically condensed and expanded to fit into the cell. Expansion fitting can be accomplished mechanically utilizing the malleable nature of the material and assisted by adjusting the cure conditions.

The porous septum cap 75 may be fabricated and inserted into a cell 30 using various techniques. For instance, the porous septum cap 75 may be formed to a desired size external to the cell and prior to being inserted into the cell 30. This porous septum cap 75 may then be inserted into the cell 30 and mechanically and/or chemically adhered in position within the cell 30. For instance, the porous septum cap 75 may undergo a curing process, within the cell 30. The porous septum cap 75 may be adhered directly to the interior walls of the cell. Stated another way, an intervening mechanical anchoring structure is not positioned between the porous septum cap 75 and the interior of the cell wall. Moreover, there are no changes in the surface characteristics of the porous septum cap 75 between the portions adhered to the wall and, for example, the surfaces of the porous septum cap 75 at the center of the cell 30. According to various embodiments, the manufacturing process may comprise a dispenser which is inserted into the cell and an expanding porous septum cap 75 is sprayed and/or dispersed at a desired height and/or level within the cell 30. According to various embodiments, the porous septum cap 75 may be held in place using adhesive, adhesive binder properties of the porous septum cap 75 material, and/or through a friction fit. A mechanical attachment may be used to secure the porous septum cap 75 in position within the cell 30. For instance, the walls internal to each cell 30 may be configured to receive the porous septum cap 75, such as through flanges coupled to the interior wall of the cell 30. Also, the expansion of the porous septum cap 75 may be configured to place a stress on the walls of the cell 30 such that the friction holds porous septum cap 75 in position.

In operation, acoustic treatment structures are typically incorporated in the engine inlet, nacelle and exhaust structures. For instance, airflow surfaces over elements of an aircraft, such as airflow over top sheet 10, may be perforated with thousands of perforations 60 typically in the range of about 1 mm/0.04 inch in diameter. Conventionally, the perforations 60 are configured to attenuate the jet engine's noise by damping the energy response, directing the sound into the cell 30 of the honeycomb core, rather than presenting a hard surface that simply reflects the sound. The cell 30 of the honeycomb core may comprise one or more porous septum caps 75 configured for greater noise suppression and treatment of a wider range of attenuated frequencies. As mentioned above, according to various embodiments, materials described herein may provide additive noise mitigation when combined with current legacy Aerostructure acoustic treatments.

Figure 4:
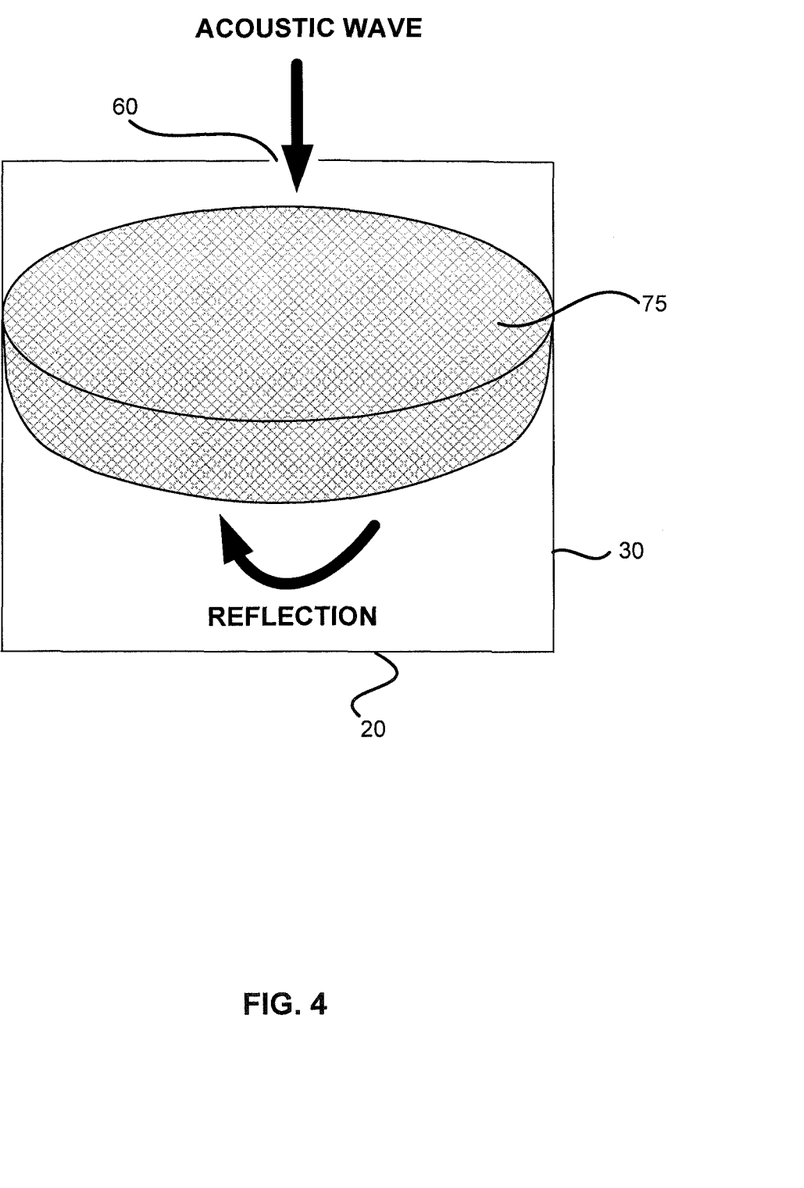
FIG. 4 illustrates a passive sound wave mitigation, in accordance with various embodiments.

According to various embodiments and with reference to FIG. 4, an acoustic wave may enter perforation 60 and travel into the cell 30 of the honeycomb core. At least a portion of the wave and/or selected frequencies of the acoustic wave may pass through the open cell porous septum caps 75. After exiting the porous septum caps 75 the wave may be reflected off the back skin 20 and be reflected back up towards the bottom surface 20 porous septum caps 75. A portion of the acoustic wave may pass through the porous septum caps 75 while a portion of the acoustic wave may be further reflected down towards the back skin. This process may repeat thus helping to dampen the acoustic wave exiting the cell.

According to various embodiments, the cell 30 may form a Helmholtz 'cavity' resonator or diaphragm resonator as a result of air passing in and out through the perforation. The speed of the acoustic wave, thickness of top sheet 10, volume of the channel, and the volume of the porous septum caps 75, may contribute to the damping achieved by dissipation of acoustic waves and/or changing the pressure conditions within the cell. The pressure in the channel may change by the influx and efflux of air flow through the perforation 60. The acoustic wave may react with a surface within the honeycomb channel such as a surface of the porous septum caps 75 and be reflected back towards perforation 60. The acoustic wave may exit perforation 60 and/or be reflected again towards the porous septum cap 75, within the channel.

Figure 5A:
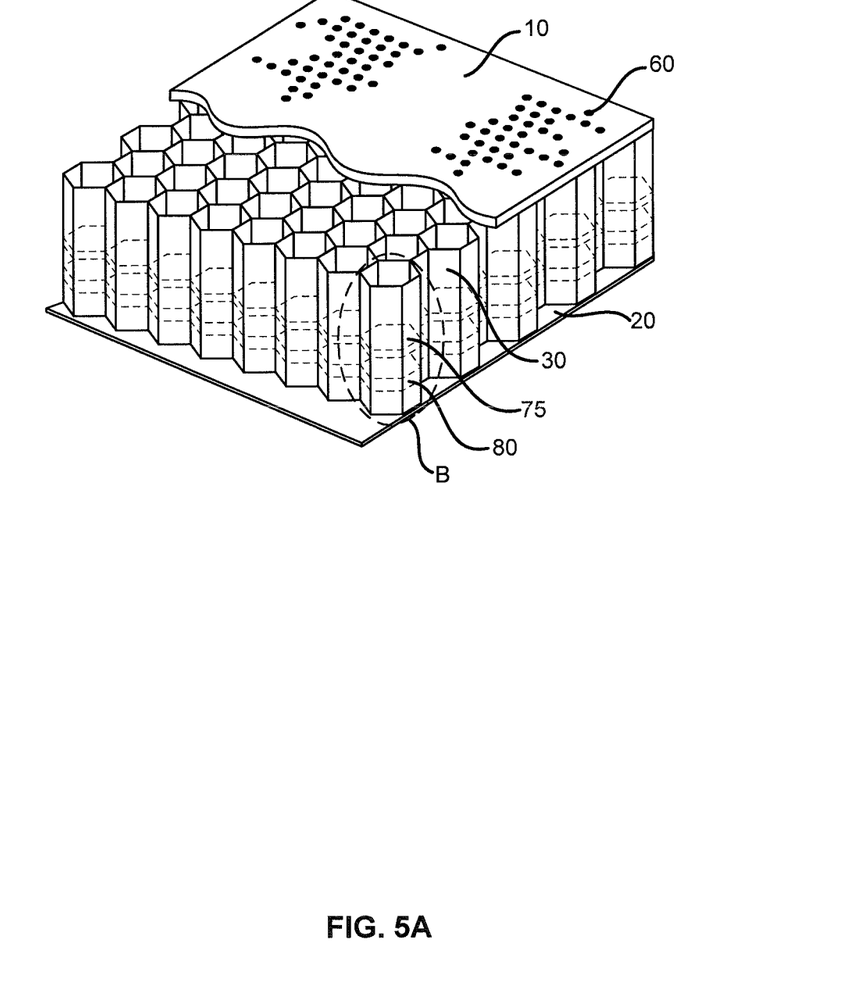
FIG. 5A depicts two levels of porous septum caps disposed within a honeycomb core, in accordance with various embodiments.
Figure 5B:
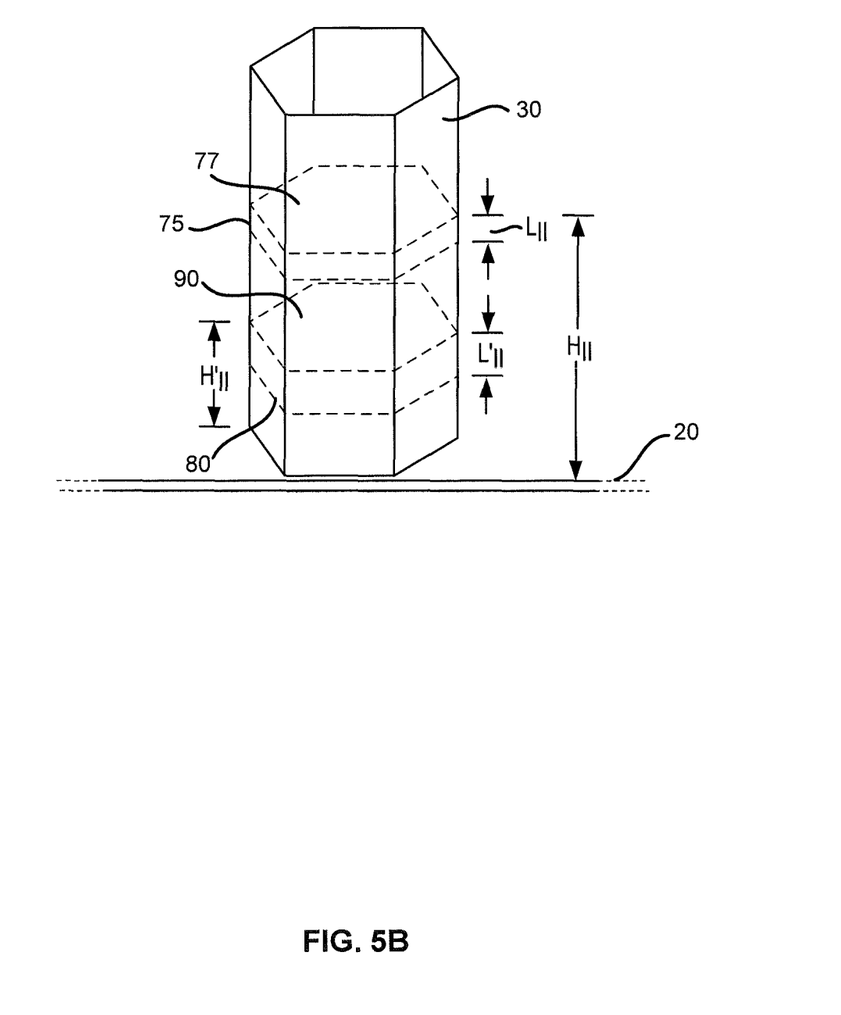
FIG. 5B depicts a close-up view of a honeycomb cell of FIG. 5A, in accordance with various embodiments.

The open cells of the porous septum cap 75 may facilitate a sound wave to travel through the porous septum cap 75 to the back skin 20 and reflected back up to through the porous septum cap 75. The wave may then be interfered with by the porous septum cap 75. According to various embodiments and with reference to FIGS. 5A-5B, more than one porous septum cap 75 may be disposed within a cell 30. These the porous septum caps 75 may be bonded to the cell 30 of the honeycomb core at different heights H, H' and be fabricated to different thicknesses L, L' to produce a thicker foam effect. As discussed herein height may refer to the level of the top surface of each porous septum cap as measured from the back skin. Stated another way, one or more porous septum cap 75, 80 may be formed and inserted into a cell 30 of the honeycomb core. These porous septum caps 75, 80 may be located at various heights within the cell 30 based on the frequency of the wavelength they are configured to dissipate. Moreover, the porous septum caps 75, 80 may comprise various thicknesses. The height within the channel and/or thickness of the porous septum cap or caps, 80 may be tuned to address specific frequencies of sound waves. The porosity of the porous septum cap 75 may be different from the porosity of porous septum cap 80. Though, the surfaces 77, 90 depicted in FIG. 5B are shown as being top surfaces of the porous septum caps 75, 80, surfaces as described herein, may be any surface on and/or within the porous septum caps 75, 80. Thus, an acoustic wave exiting the cell 30 may be dissipated and/or cancelled based on its interactions with one or more layers of the porous septum caps 75, 80. The porous septum cap 75, 80, may be spaced apart within the cell 30 and/or be stacked within the cell 30 of the honeycomb core. A broad spectrum of many wavelengths may be treated via multiple layers of porous septum caps 75, 80 in a cell 30 or a series of cells/channels. For instance, different wavelengths may interact with different surfaces 77, 90 of the layers of porous septum caps 75, 80. Thus a single channel may be configured to address a plurality of acoustic waves entering the channel.

Multiple layers of porous septum caps 75, 80 may be stacked and in contact with each other. Porous septum caps 75, 80 may comprise different porosity, pore size, density/weight, roughness (on a nano or micro scale) and film/foam thickness. In this way, by stacking porous septum caps 75, 80 of varying porosity, pore size, and/or thickness, a single acoustic treatment material may be formed that comprises varying porosity and/or pore size in the same/continuous thickness of material. In this way, the porous features of the composite porous septum cap (e.g., stacked layers of porous septum caps) are tailored.

According to various embodiments, the inherently porous material disposed between the perforated top sheet and the back skin may comprise a first inherently porous material, and the acoustic structure may comprise M layers of inherently porous material disposed between the top sheet and the back skin, wherein the M layers are positioned in the same cell, and where M is an integer greater than 2.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

What is claimed is:

1. An acoustic structure, comprising
a perforated top sheet;
a core accessible via the perforated top sheet, defining a cell comprising a plurality of interior walls;
a back skin; and
an inherently porous material embedded with an adhesive binder forming a self-adhering porous septum cap disposed within the cell between the perforated top sheet and the back skin, wherein the inherently porous material forms a plane coupled to each interior wall of the plurality of interior walls to subdivide the core, wherein the plane is substantially parallel to the perforated top sheet.

2. The acoustic structure of claim 1, wherein the inherently porous material is an open cell material.

3. The acoustic structure of claim 1, wherein the inherently porous material is expanded into position within the core.

4. The acoustic structure of claim 1, wherein the inherently porous material comprises a randomized pore distribution.

5. The acoustic structure of claim 4, wherein the inherently porous material is non-woven material.

6. The acoustic structure of claim 1, wherein the inherently porous material comprises a metal such as nickel, nickel alloy, stainless steel, stainless steel alloy, titanium, titanium alloy, Inconel, copper, bronze, and aluminum and aluminum alloy.

7. The acoustic structure in claim 6, wherein the inherently porous material comprises a particulate or fiber reinforced metal.

8. The acoustic structure of claim 1, wherein the inherently porous material comprises a ceramic such as Aluminum oxide, Beryllium oxide, Cerium oxide, Zirconium dioxide, Boride, Silicon Carbide.

9. The acoustic structure of claim 8, wherein the inherently porous material comprises a particulate or fiber reinforced ceramic.

10. The acoustic structure of claim 1, wherein the inherently porous material comprises a non-woven carbon material such as carbon nanotubes, carbon nanofibers or graphitic carbon.

11. The acoustic structure of claim 1, wherein the inherently porous material comprises a polymeric material comprising Polyimide, Bismaleimide (BMI), or Phenolic.

12. The acoustic structure of claim 11, wherein the inherently porous material has an operating temperature over 350 degrees Fahrenheit.

13. The acoustic structure in claim 11, wherein the inherently porous material is a particulate or fiber reinforced polymer.

14. The acoustic structure of claim 1, wherein the inherently porous material comprises tailorable pore sizing.

15. The acoustic structure of claim 14, wherein pores of the inherently porous material are sized via chemical treatment.

16. The acoustic structure of claim 1, wherein the inherently porous material is adhered directly to the plurality of interior walls of the cell.

17. The acoustic structure of claim 1, wherein the cell comprises a Helmholtz cavity resonator.

18. The acoustic structure of claim 1, where in the inherently porous material disposed between the perforated top sheet and the back skin comprises a first inherently porous material, and the acoustic structure comprises a second inherently porous material disposed between the top sheet and the back skin removed from the first inherently porous material disposed between the top sheet and the back skin, wherein the first inherently porous material and the second inherently porous material are positioned within the same cell.

19. The acoustic structure of claim 1, wherein the inherently porous material disposed between the perforated top sheet and the back skin comprises a first inherently porous material, and the acoustic structure comprises M layers of inherently porous material disposed between the top sheet and the back skin, wherein the M layers are positioned in the same cell, and where M is an integer greater than 2.

* * * * *